United States Patent [19]

Ravi Chandran

[11] Patent Number: 5,038,390
[45] Date of Patent: Aug. 6, 1991

[54] METHOD OF TRANSFORM DATA COMPRESSION USING SAVE-MAPS

[75] Inventor: Vellore C. Ravi Chandran, Vernon Hills, Ill.

[73] Assignee: Kabushiki Kaisha Toshiba, Kanagawa, Japan

[21] Appl. No.: 533,348

[22] Filed: Jun. 5, 1990

[51] Int. Cl.$^5$ .............................................. G06K 9/00
[52] U.S. Cl. ...................................... 382/56; 382/50; 358/433; 358/426; 364/260.6
[58] Field of Search .................. 358/433, 426; 382/56, 382/50; 364/260.6

[56] References Cited

U.S. PATENT DOCUMENTS 4,553,171 11/1985 Holladay et al. ................... 358/263
4,581,638 4/1986 Chiariglione et al. .............. 358/135

Primary Examiner—David K. Moore
Assistant Examiner—Daniel Santos
Attorney, Agent, or Firm—Finnegan, Henderson, Farabow, Garrett and Dunner

[57] ABSTRACT

A method for compressing the data required to represent an image using a set of save-maps, with each save-map being identified by an index and each save-map identifying a subset of transform coefficients. The method begins by spatially partitioning the image into a plurality of blocks, includes the generation of transform coefficients representative of the data spatially located in each block; the generation of an index for each block as a function of the transform coefficients for that block; and selecting one of the save-maps as a function of the index. By employing the index and the value of the magnitude components of the subset of transform coefficients identified by the selected save-map for each block, compressed data may be obtained representative of that portion of the image spatially contained in each of the corresponding blocks. Thus, each save-map permits retrieving the original image in accordance with the save-map and data representative of the magnitude components of the subsets of transform coefficients identified by the save-maps.

8 Claims, 6 Drawing Sheets

1.) $ZA_1$ = SUM OF ALL COEFFICIENTS IN ZONE $20_1$
    $ZA_2$ = " " " " " ZONE $20_2$
    $ZA_3$ = " " " " " ZONE $20_3$
    .                           .
    .              . . .        .
    .                           .
    $ZA_6$ = " " " " " ZONE $20_6$

2.) $TA = ZA_1 + ZA_2 + ZA_3 \cdots ZA_6$

3.) $NZA_y = ZA_y / TA$

4.) $\boxed{\text{SAVE - MAP INDEX}}$ = TA $\left.\begin{array}{l}\text{HIGH}\\ \text{MEDIUM-HIGH}\\ \text{MEDIUM}\\ \text{LOW}\end{array}\right\}$ 2 BITS $NZA_1$ $\left.\begin{array}{l}\text{HIGH}\\ \text{LOW}\end{array}\right\}$ 1 BIT $NZA_2$ $\left.\begin{array}{l}\text{HIGH}\\ \text{LOW}\end{array}\right\}$ 1 BIT $NZA_3$ $\left.\begin{array}{l}\text{HIGH}\\ \text{LOW}\end{array}\right\}$ 1 BIT

.
.
.

$NZA_6$ $\left.\begin{array}{l}\text{HIGH}\\ \text{LOW}\end{array}\right\}$ 1 BIT

_____

8 BIT CODE

FIG. 3

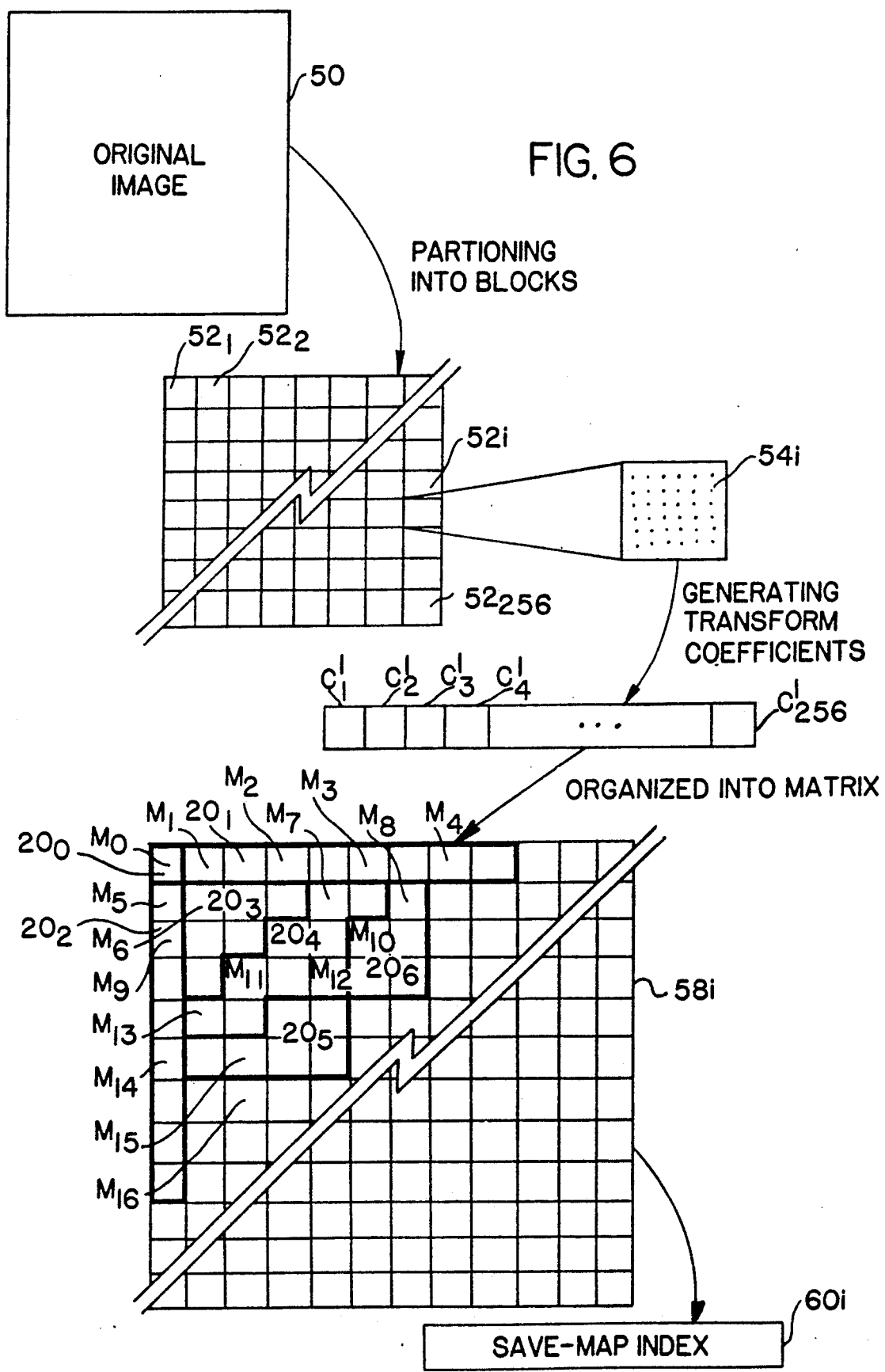

METHOD OF TRANSFORM DATA COMPRESSION USING SAVE-MAPS

BACKGROUND OF THE INVENTION

I. Field of the Invention

The present invention relates to a method of transform data compression which obtains data representing an original image using as few bits as possible while retaining satisfactory image reconstruction capabilities.

II. Background Information

Many different approaches to image data compression have been attempted. In recent years the preferred technique of image data compression has employed transform coding, with the resultant methodology referred to as transform data compression. Transform data compression techniques yield high compression ratios with only small losses in resultant reconstructed image quality.

A detailed analysis of transform coding or transform data compression can be found in a work by R. J. Clarke, "Transform Coding of Images," Academic Press, London, 1985. In general, transform data compression involves spatially partitioning an image into many sub-images or blocks of pixel data. Subsequently, independently for each block, the following operations are performed:

(1) Transformation: A transform operator, such as the Discrete Cosine Transform (DCT) is applied to pixel data representative of that portion of the image on each block, resulting in a block of transform coefficients for each block. These transform coefficients contain all the information that was in the original pixel data for each block. However, the distribution of that information is now in the frequency domain as opposed to being in the spatial domain. That is to say, the transform coefficients each have a magnitude and frequency component. The transform operator has information compacting properties. As a consequence, a large fraction of the original image information is contained in the magnitude components of a small subset of the transform coefficients. This is the basis of transform coding. Only the magnitude components of the resultant small subset of transform coefficients now need be saved to retrieve the original information in each corresponding block of the original image.

(2) Coefficient Selection: As noted above, only a small subset of transform coefficients need be selected and further processed. Several approaches have been tried, such as picking only those coefficients with magnitude components above a certain threshold or picking the coefficients with the "n" largest magnitude components. Using a small subset of coefficients requires that the magnitude components of the individual selected coefficients be retained for further processing. In addition, each set of coefficients is organized into a matrix based on the frequency components of the coefficients and the location in that matrix is identified and retained of those coefficients whose magnitude component is to be retained. Location information is required during decompression or expansion of the compressed image.

One approach to saving location information has been to insert run-length counts for the coefficients that have not been selected. These run-length counts give a count of the number of consecutive, deleted coefficients. The run-length counts are inserted, in the order of occurrence, into the stream of selected coefficient magnitudes.

(3) Quantization: The dynamic range of the coefficient magnitudes components may exceed the dynamic range of the spatial pixel data itself. In order to achieve compression, the dynamic range of the saved coefficient magnitude components must be reduced. This may be done by a many-to-one mapping procedure. For example, a simple linear operator such as dividing all coefficient magnitude components by a known constant could be employed. Nonlinear operators can also be employed. Some amount of error will be introduced by this procedure, with the magnitude of the error depending on the quantization operator used and the probability distribution of the pixel data values.

(4) Coding: After quantization, additional compression may be obtained by assigning variable length code words to each quantized magnitude component. The length of the code words is based on the frequency of occurrence of each quantized magnitude component. Frequently occurring quantized magnitude components may have short codes, while rarely occurring values have long codes. The overall number of bits used to save the quantized magnitude components can thereby be reduced. Huffman coding procedure is known to be optimal and is the most commonly used technique.

In each known prior art method of transform data compression there are two significant drawbacks with the coefficient selection schemes employed. First, the resultant image reconstruction data contains both coefficient magnitudes and run-length counts of deleted coefficients. This intermingling of data requires the processor of the resultant data to employ a decision-making step, which significantly increases the data processing time involved. Second, since matrix location information is saved as run-length counts, which utilize a significant amount of the fixed total number of bits available, there are fewer bits available for saving coefficient magnitudes, which results in a degradation of the image quality.

It is, accordingly, an object of the present invention to provide an improved method of compression and, in particular, an improved method of coefficient selection.

Additional objects and advantages of the invention will be set forth in the description which follows, and in part will be obvious from the description or may be learned by practice of the invention.

SUMMARY OF THE INVENTION

To achieve the foregoing objects, and in accordance with the purposes of the invention as embodied and broadly described herein, a method for compressing the data required to represent an original image using a set of save-maps is provided, with each save-map being identified by an index and each save-map identifying a subset of transform coefficients, the method comprising the steps of: spatially partitioning the image into a plurality of blocks; generating, for at least a subset of said blocks, a set of transform coefficients representative of the data spatially located in that block, with each of these transform coefficients having a magnitude component and a frequency component; generating an index for each block as a function of the transform coefficients for that block; selecting one of the save-maps as a function of the index; and employing the index and the magnitude components of the subset of transform coefficients for the block identified by the selected save-map for that block, to represent that portion of the data spatially contained in that block.

Preferably, the method of the subject invention includes the substeps of generating the index for each block by: organizing the set of transform coefficients for that block into a matrix based on the frequency components of the transform coefficients; partitioning at least a portion of the matrix into a plurality of zones; summing the absolute values of the magnitude components of the transform coefficients in each zone to obtain a plurality of zone sums; summing the absolute values of the magnitude components of all the transform coefficients to obtain a total sum; dividing each zone sum by the total sum to obtain a normalized zonal activity level for each zone; and comparing the total sum and the normalized zonal activity levels with corresponding predefined empirical values to generate a code which constitutes the index for the block.

In still more detail, the method of the subject invention further comprises the step of generating the set of save-maps by: spatially partitioning at least one sample image similar in character to the original image into a plurality of blocks; generating a set of transform coefficients for a plurality of those blocks, the transform coefficients for each block having a magnitude component and a frequency component, and each of the set of transform coefficients being representative of the data located in the corresponding block; generating an index for each of the plurality of blocks as a function of the transform coefficients for the corresponding block; selecting empirically from each set of transform coefficients for each block which have the same index, a subset of coefficients which most effectively represent that portion of the sample image spatially contained in the corresponding blocks; and generating for each index one save-map as a function of the set of subsets of transform coefficients corresponding to each index.

BRIEF DESCRIPTION OF THE DRAWINGS

FIG. 3 illustratively shows a method in accordance with the teachings of the present invention to obtain an index for each block;

FIG. 6 illustrates the steps of spatially partitioning an original image, generating a set of transform coefficients for each block of that image and generating an index for those coefficients.

DESCRIPTION OF THE PREFERRED EMBODIMENT

Reference will now be made in detail to the present preferred embodiment of the subject invention as illustrated in the accompanying drawings.

The method of the subject invention includes the step of selecting one of a set of predefined tables or save-maps for each block of data to be compressed. Each save-map contains a list of locations of a subset of transform coefficients whose magnitude components are to be saved. Thus, rather than having to make a selection and/or delete decision on a coefficient-by-coefficient basis, information from the entire block is used to select one predefined save-map.

Figure 1:
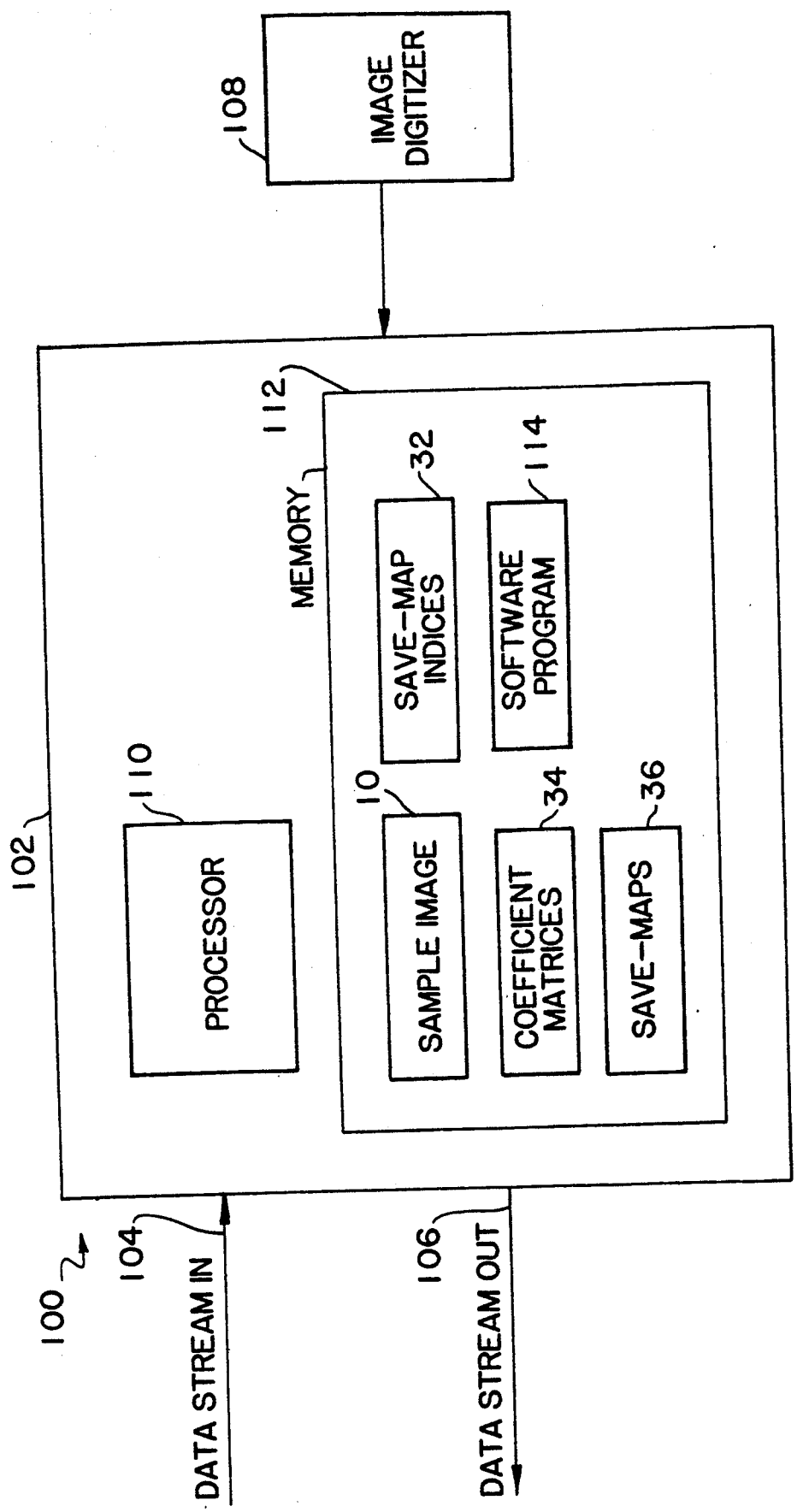
FIG. 1 is a block diagram of a data processing system of the present invention.

FIG. 1 is a block diagram of a data processing system 100 embodying the present invention. FIG. 1 includes a data processor 102, an input data stream 104, an output data stream 106, an image digitizer 108. Data processor 102 includes processor 110 and memory 112. Input stream 104 is input to data processor 102 and output stream 106 is output from data processor 102. A sample image 10 is transmitted from image digitizer 108 to data processor 102 and is stored in memory 112.

Memory 112 also stores coefficient matrices 34, save-map indices 32, save-maps 36, and other data structures described throughout the specification. In a preferred embodiment of the invention, memory 112 stores the compressed transform data, either permanently, or before the compressed data is sent over output data stream 106. Memory 112 may also include a hard disk drive, a floppy disk drive, or the like. The steps of the method of the present invention are performed when processor 110 executes a software program 114 stored in memory 112.

To practice the invention, the set of predefined save-maps for a particular type of image must first be generated. Preferably, the set of predefined save-maps is generated by spatially partitioning at least one sample image into a plurality of blocks. The sample image preferably is similar in character to the original image for which data is to be compressed. For example, if the image for which data is to be compressed is a neck x-ray of a particular patient, the sample image should be a typical neck x-ray. Sample image 10 is shown by way of example in FIG. 2 as being partitioned into 256 blocks, $12_1-12_{256}$. Each block $12_n$ preferably has a similar number of pixels $14_n$ of the sample image contained therein. The number of 256 blocks is used by way of illustration and sample image 10 may, in fact, be divided into any appropriate number of individual blocks.

The next step in generating the requisite predetermined set of save-maps comprises the step of generating a set of transform coefficients for each of at least a subset of the blocks $12_n$. The subset may comprise all the blocks $12_n$. It is also possible to exclude from the subset block $12_n$ which contain no useful image information.

Figure 2:
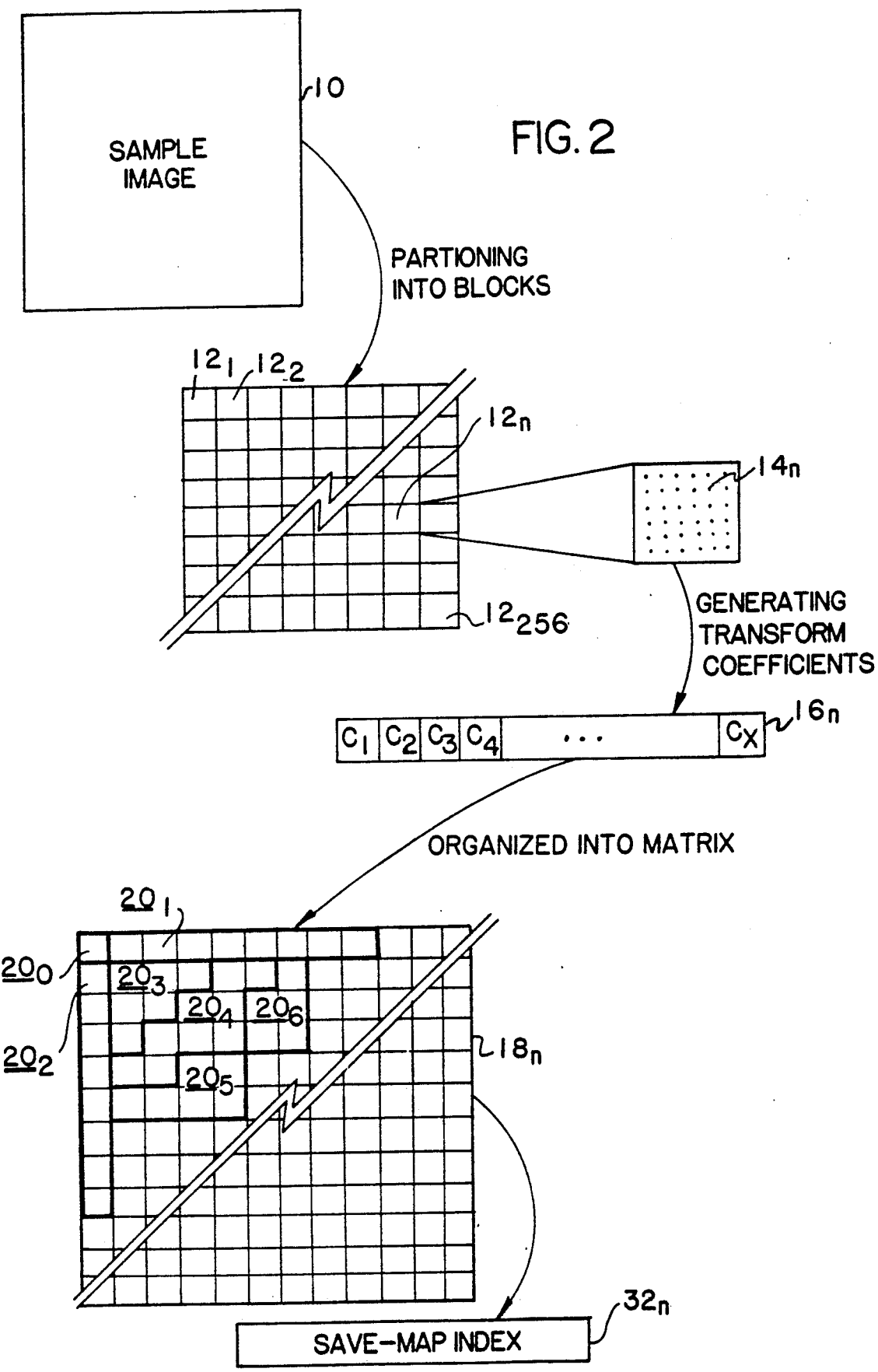
FIG. 2 illustrates the preliminary steps of generating a set of save-maps in accordance with the teachings of the subject invention.

As should be well understood by those of ordinary skill in the art, transform coefficients for a block of pixel data each have a magnitude component and frequency component, and the resultant set of transform coefficients for each block is representative of the pixel data located in that corresponding block. For example, as shown in FIG. 2, a particular block $12_n$ contains pixels $14_n$ which may be represented by corresponding pixel data. This pixel data is transformed, for example, by a standard transform operator, such as the DCT operator, into a set of transform coefficients $16_n$ which are illustratively shown as comprising coefficient $C_1, C_2, C_3, \ldots, C_X$. As should be understood by those skilled in the art, each of coefficients $C_1-C_X$ includes a magnitude component and a frequency component. Preferably, the number of transform coefficients in set $16_n$ is equal to the number of pixels $14_n$ in any particular block $12_n$.

The next step of the method of the subject invention is generating an index for each of the blocks $12_n$ as a function of the transform coefficients for the corresponding block. The computation of an index in accordance with the teachings of the subject invention may be accomplished in many different ways. The following is a description of a preferred embodiment for generating an index for block $12_n$ of FIG. 2. First, the set of transform coefficients $16_n$ for block $12_n$ are organized into a matrix $18_n$ based on the frequency components of those coefficients. For example, the DC transform coefficient $C_1$ may be located in the upper left-hand corner of matrix $18_n$, and the remaining coefficients distributed in a predefined order based upon the frequency components.

Next, the array of coefficients $16_n$ in matrix $18_n$ are partitioned into a plurality of zones $20_1$-$20_6$. (In FIG. 2, the left, upper corner is referenced by $20_0$). As noted above, the upper left-hand transform coefficient in location $20_0$ is the DC coefficient, which represents the average overall intensity value associated with block $12_n$ in the spatial domain. The zones $20_1$-$20_6$ preferably represent a particular spatial structural component of the sample image. For example, in the matrix $18_n$ of FIG. 2, zone $20_1$ may represent vertical structural components and zone $20_2$ may represent horizontal structural components in the original block $12_n$. The shape and sizes of the zones will depend on the class of images being compressed and the desired compression ratio.

The entire matrix $18_n$ need not be partitioned into zones. In fact, the zones should include only those transform coefficients likely to contain information useful for image reconstruction, and exclude all others. Thus, while the zones are preferably symmetrically situated around the upper left-hand corner, the particular zone geometry is dependent on the coefficient activity level of the block. The higher activity level coefficients, i.e., the coefficients with the largest magnitude components, should be allowed more zones covering a larger total region than lower activity level classes. The total number of zones is limited by the hardware used to implement the invention. The total number of bits per save-map in the present preferred embodiment is 512 (i.e., 512×256 total bits), with six zones per save-map.

Each coefficient in each zone, as should be apparent to those of ordinary skill in the art, has a magnitude component. In accordance with the teachings of the subject invention, the step of generating an index next preferably comprises the substeps of summing the absolute values of the magnitude components of the transform coefficients in each zone to obtain a plurality of zone sums; summing the absolute values of the magnitude components of all the transform coefficients to obtain a total sum; dividing each sum zone by the sum total to obtain a normalized zonal activity level for each zone; and comparing the total sum and the normalized zonal activity levels with corresponding predefined empirical values to generate a code that constitutes the index for the block.

As illustratively shown in FIG. 3 by way of example and not limitation, $ZA_1$ through $ZA_6$ represent the absolute magnitudes of the coefficients in each zone $20_1$-$20_6$ of block $12_n$, respectively. For example $ZA_1$ represents the sum of the absolute magnitude components of all coefficients in zone $20_1$. TA represents the sum of the absolute magnitudes of all the coefficients of block $12_n$ and is, therefore, a total sum. A normalized zonal activity level for each zone, i.e., $NZA_y$, for a particular zone y, is equal to the zonal activity level of that zone, $ZA_y$, divided by the total activity level for the block, TA.

The total activity level, TA, for each block $12_n$ is then preferably thresholded to fall into one of four activity class bins: HIGH, MEDIUM-HIGH, MEDIUM and LOW. This step will categorize the corresponding block as belonging to one of four activity classes. The result of the thresholding is a 2-bit code that identifies one of the above activity classes. The actual threshold levels are empirically selected based upon observation of a representative sample of blocks from sample image 10.

Each normalized zonal activity level, NZA, is then independently thresholded to fall into one of two activity bins: HIGH and LOW. This will categorize each zone as being either highly active or not. Again, the actual threshold levels are empirically chosen. A 1-bit code will thus be generated for each zone. If there are six zones, six 1-bit codes ("zone codes") will result which, when concatenated with the 2-bit TA code, produce an 8-bit code. This 8-bit code forms the save-map index.

To generate the predetermined set of save-maps, each of at least a subset of blocks $12_n$ are transform coded to produce corresponding sets of transform coefficients and save-map indices. The next step is to select empirically from each set of transform coefficients for each block having the same index, a subset of coefficients to represent that portion of the sample image spatially contained in the corresponding blocks. From this subset, a single save-map is generated for the corresponding index, with the save-map identifying the locations of the selected subset of coefficients. Thus, save maps are, in effect, a list of offset addresses. During data compression, whenever a particular set of transform coefficients generates a particular index, only the values of the magnitude components of those transform coefficients at the locations of the corresponding save-map will be saved.

The particular empirical method used to select a save-map for each index is not critical to the invention, and certainly is not constrained to any one particular algorithm. Several coefficient selection schemes may be used. For example, the original coefficients with the "n" largest magnitude components in each block may be selected or all original coefficients with magnitude components above a certain threshold may be selected. The selection of save-maps therefore involves the following steps:

(1) for each block of a sample image, compute original transform coefficients as set forth above;
(2) compute a save-map index, as described above;
(3) identify the most significant original coefficients for each index using any method such as those described above; and
(4) save a list (save-map) identifying the locations of the most significant coefficients for each group of coefficients having the same index.

The above described method produces one save-map for every index. For example, if as described earlier, six zones are defined, each index will comprise an 8 bit code and the total number of different indices will equal 256 ($2^8$). The transform coefficients produced by each block of data $12_n$ from the sample image are sorted by index into 256 separate bins. For example, in FIG. 4 bins $30_1$ through $30_n$ are shown for indices $32_1$ through $32_n$, respectively. Matrices $34_1$ of coefficients which produce index $32_1$ are located in bin $30_1$, while matricies $34_n$ of coefficients which produce index $32_n$ are located in bin $30_n$. It should be understood that matrices $34_1$–$34_n$ are preferably generated from more than one sample image. Thus, there may be more than 256 matrices $34_1$–$34_n$.

As should be understood by those skilled in the art, if the choice of zone sizes and shapes was reasonable, and the coefficient selection algorithm used in the save-map selection process was appropriate, then the useful coefficients for each block in any one of the bins should be very similar to each other. This similarity is then exploited by having just one save-map $36_1$ through $36_n$ for each bin or a total of 256 save-maps for a complete file of 256 save-maps.

More specifically, for each bin the average number of useful coefficients for each block may be first computed; this will be the number of coefficients in the save-map for this bin. A probability distribution may be plotted of the magnitude component values versus frequency of occurrence in the coefficients in that bin. The more frequently occurring coefficients are obviously representative of that bin and are, therefore, included first in the save-map. The save-map for that bin will, therefore, include the location of all the frequently occurring coefficients.

This process may be repeated for several sample images to obtain a fairly representative sample of useful coefficients. Since the generation of one save-map for each bin only has to be done once for a given class of images, the complexity of the computation of the save-maps and the execution time are not important considerations. It is merely necessary that an empirical process be undertaken to select from the original transform coefficients of sample images a subset of the most useful coefficients for each index. These locations are defined by a save-map for each index to permit matching each corresponding block from a subsequent original image of a given index to that corresponding one save-map.

Figure 4:
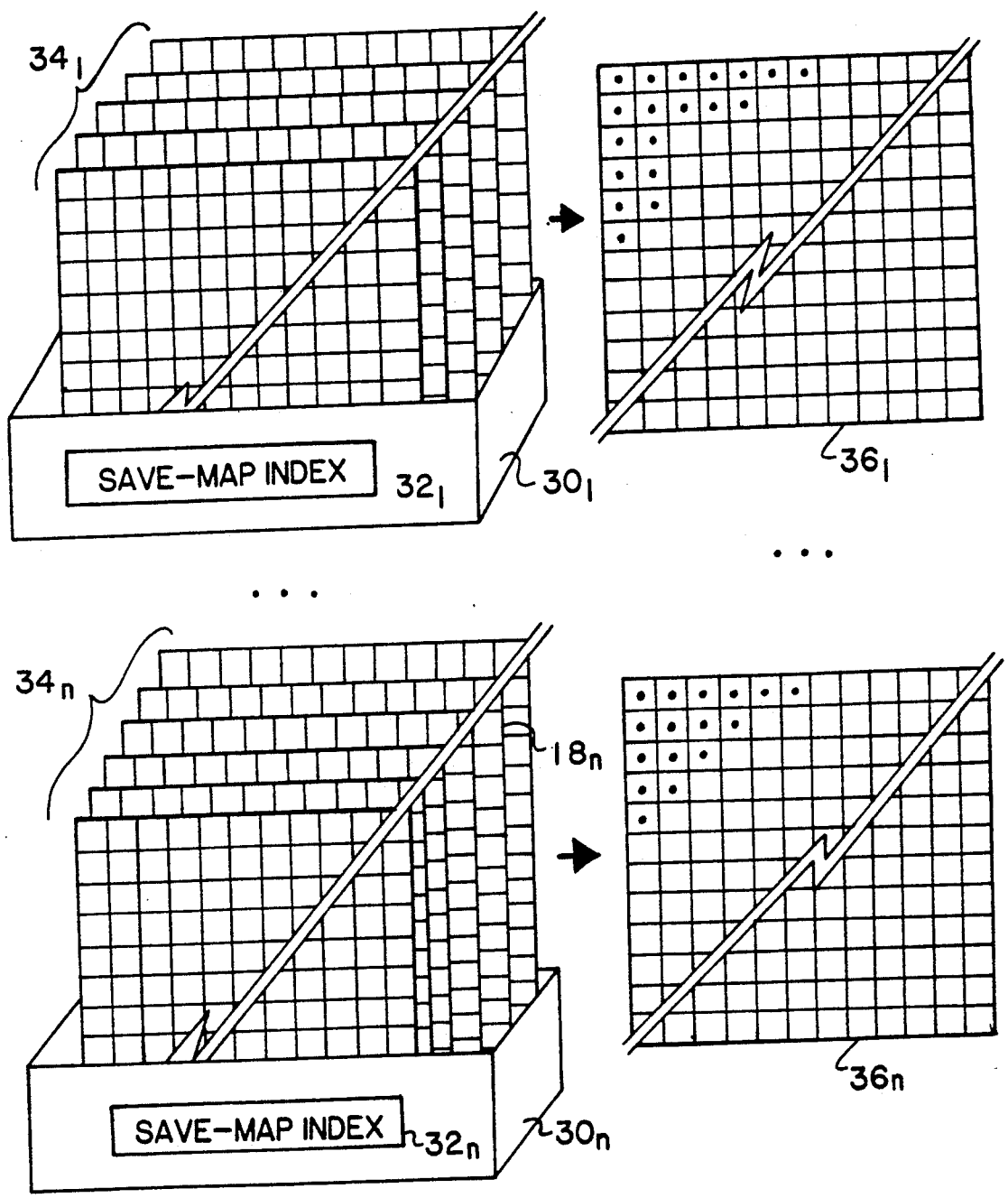
FIG. 4 illustrates the substep of generating for each index one save-map.

The above-described methods thus contemplate generating for each index one unique save-map, such as save-map $36_n$ of FIG. 4, as a function of the average number of useful original transform coefficients for the plurality of sample image blocks corresponding to that index. The index for that save-map is a unique save-map index $32_n$.

Figure 5:
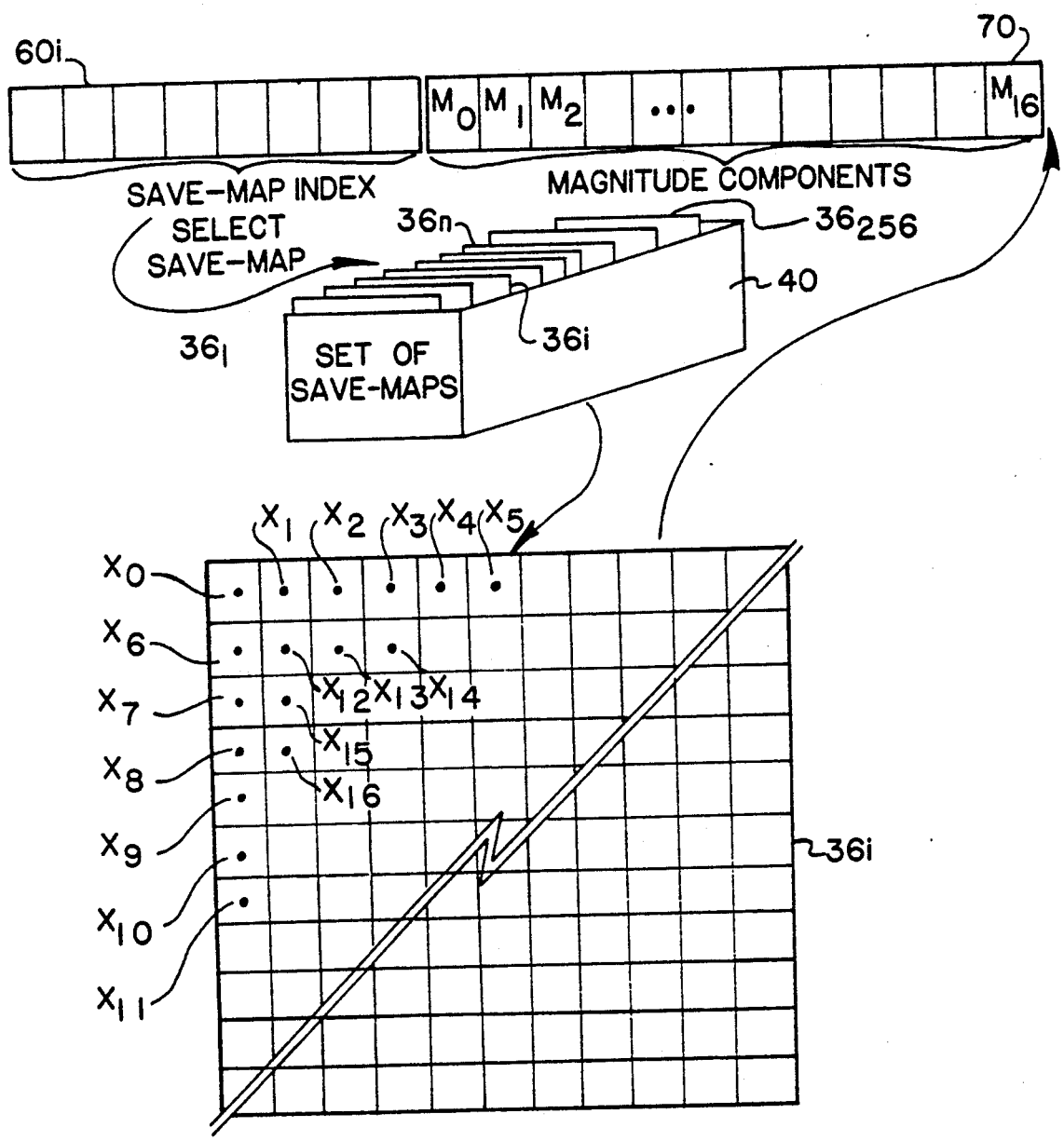
FIG. 5 illustrates the method in accordance with the subject invention of employing each generated index to identify a unique save-map.

The above-described process for selecting a save-map for each index is continued until a predetermined set of save-maps is obtained such as set 40 shown in FIG. 5. As noted above, with an index of 8-bits in length, there are a possibility of 256 different indexes and, accordingly, set of predetermined save-maps 40 should comprise 256 individual save-maps $36_1$ through $36_{256}$. What follows is a description of how this file is used to compress data required to represent an image using the teachings of the subject invention.

The first step to compress the data required to represent an original image is to spatially partition that original image into a plurality of blocks. For example, as shown FIG. 6, original image 50 is partitioned into a plurality of blocks $52_1$–$52_{256}$. This step of spatially partitioning the original image is essentially identical to the previous step of spatially partitioning the sample image 10. The term "original image" is generic to any image, the date representing which is to be compressed. The precise number of blocks used is irrelevant, the number 256 being used as an example and not a limitation.

The next step is to generate for each block of at least a subset of the blocks $52_1$ through $52_{256}$ a set of transform coefficients representative of the data spatially located in that block. Preferably, this step of generating is performed for each of blocks $52_1$ through $52_{256}$. If certain blocks $52_1$ through $52_{256}$ do not contain image information to be compressed, those blocks may be excluded from the subset. This step of transform coefficient generation is essentially identical to that described above. Specifically, the spatial data represented by pixels $54_i$ for any particular block $52_i$ is transformed into a plurality of coefficients $C'_1$ through $C'_{256}$. These coefficients are organized into a matrix $58_n$ in accordance with their frequency component in essentially the same manner as coefficient $16_n$ were arranged in matrix $18_i$ as described above. Thus, matrix $58_i$ has zones $20_1$ through $20_6$ as described above.

The next step is to generate an index for the blocks of the original image 50 as a function of the transform coefficients for those blocks. As described above, the transform coefficients for any particular block $52_i$ are partitioned into different zones $20_1$ through $20_6$ in matrix $58_i$. In addition, certain "activity" parameters for the entire block ("activity class") and for each zone ("activity level") are calculated as described above. The activity parameters for each zone are then converted into binary values (i.e., 1 or $20_1$) by thresholding, either into an HIGH level or an LOW level. The resultant string of binary data, i.e., the activity class and the activity levels, can then be used as a save-map index $60_i$ as shown in FIG. 6. The method used to generate this save-map index is preferably identical to the method used to generate the save-map indices referred to above and utilized in the creation of the predetermined set of save-maps 40.

The next step is to select one of the save-maps from file 40 as a function of index $60_i$. This is accomplished by simply selecting the save-map $36_i$ which corresponds to save-map index $60_i$.

Once the appropriate save-map has been selected through the utilization of the save-map index, that save-map provides a list of the locations of the coefficients whose magnitude components are to be saved. Namely, given save-map $36_i$ of FIG. 5 and transform coefficients of matrix $58_i$ of FIG. 6, only the magnitude components $M_0$ through $M_{16}$ of those transform coefficients in matrix $58_i$ which are located at the corresponding positions $X_0$ through $X_{16}$ of save-map $36_i$ are selected. These specified magnitude components $M_0$ through $M_{16}$ are then quantized and encoded as described above.

The only other piece of information necessary for image expansion, in addition to these quantized and encoded specific coefficients, is index $60_i$ which identifies the save-map $36_i$ utilized. This index is, therefore, also encoded and saved with the selected coefficients. The resultant image representation 70 as shown in FIG. 5 comprises an 8-bit save-map index and data representative of the magnitudes of the subset of transform coefficients identified by the save-map corresponding to that save-map index. Data corresponding to the DC component, i.e., the transform coefficient $M_0$ in the upper left-hand corner of matrix $58_i$ in FIG. 6 is preferably always included in the image representation.

The above method covers all the processing required, is computationally simple, and requires almost no decision making by the operators. As noted above, each save-map identifies a subset of the original coefficients to be saved. The storage format of a save-map may, for example, be as follows:

| Location | |
|---|---|
| 0 | Count of the number of coefficients saved (K) |
| 1 | Address of saved coefficient No. 1 |
| 2 | Address of saved coefficient No. 2 |
| ... | ... |
| K | Address of saved coefficient No. K |

The coefficient addresses are, of course, offsets within the original n-by-m block array or matrix of transform coefficients.

The image representation data stream comprising the index for each block (to identify a save-map which in turn identifies the locations of the transform coefficients selected) and data representing the magnitudes of the transform coefficients in those selected locations is subsequently employed to retrieve the original image in accordance with the corresponding save-map. For example, save-map $36_i$ is used to determine the location of magnitude coefficients $M_0$ through $M_{16}$ of the image representations data stream 70 of FIG. 5; component $M_0$ being located in location $X_0$, $M_1$ in $X_2$, $M_2$ in $X_2$, $M_3$ in $X_3$, and so on.

The map-based code algorithm of the subject invention was implemented as described above and tested on several x-ray images. The results of this algorithm were compared to other techniques in terms of image quality, signal-to-noise ratio and presence of spurious artifacts. The significant advantages are the simplicity of the hardware and software required to implement this scheme and the speed of execution.

Additional advantages and modifications will readily occur to those skilled in the art. The invention in its broader aspects is, therefore, not limited to the specific details and illustrative examples shown and described. Accordingly, departures may be made from such details without departing from the spirit or scope of applicant's general inventive concept.

I claim:

1. A method for compressing the data required to represent an original image by using a predefined set of save-maps, with each save-map being identified by an index and each save-map identifying a subset of transform coefficients, comprising the steps of:
   spatially partitioning said image into a plurality of blocks;
   generating, for each block of at least a subset of said plurality of blocks, a set of transform coefficients representative of the data spatially located in that block, with each of said transform coefficients having a magnitude component and a frequency component;
   partitioning each block of transform coefficients into a plurality of zones, the dimensions of each said zone being a function of the different visual components of the image;
   generating an index independently for each said block as a function of the energy level in more than one zone of the block;
   selecting one of said save-maps as a function of said index; and
   employing said index and the magnitude components of the subset of transform coefficients for each said block identified by said selected save-map for that block to represent that portion of said image spatially contained in that block.

2. The method of claim 1 wherein the step of generating an index for each said block comprises the steps of:
   organizing the set of transform coefficients for that block into a matrix based on said frequency components of said transform coefficients;
   partitioning at least a portion of said matrix into a plurality of zones;
   summing the absolute values of the magnitude components of the transform coefficients in each zone to obtain a plurality of zone sums;
   summing the absolute values of the magnitude components of all the transform coefficients to obtain a total sum;
   dividing each zone sum by said total sum to obtain a normalized zonal activity level for each zone; and
   comparing said total sum and said normalized zonal activity levels with corresponding predefined empirical values to generate a code which constitutes the index for each said block.

3. The method of claim 2 wherein the substep of comparing comprises:
   comparing said total sum for each said block with a series of thresholds to generate a block code for the total sum of that block;
   comparing the normalized zonal activity level of each zone in that block with a threshold to generate a zone code for each zone sum; and
   combining said block code and the plurality of zone codes to obtain the index for that block.

4. The method of claim 1 further comprising the step of generating said set of save-maps by:
   spatially partitioning at least one sample image similar in character to said original image into a plurality of blocks;
   generating a set of transform coefficients for each block of at least a subset of said plurality of said blocks, said transform coefficients for each block having a magnitude component and a frequency component, and each said set of transform coefficients being representative of the data located in the corresponding block;
   partitioning each block of transform coefficients into a plurality of zones, the dimensions of each said zone being a function of the different visual components of the image;
   generating an index for each said block as a function of the energy level in more than one zone of the block, said index being capable of being computed independently for each said block;
   selecting from each set of transform coefficients for each block which have the same index, a predefined subset of coefficients to represent that portion of said sample image spatially contained in the corresponding blocks; and
   generating for each index one save-map as a function of said subsets of transform coefficients corresponding to each said index.

5. The method of claim 1 further comprising the step of repeating said steps of generating, selecting and employing for each of said plurality of said blocks.

6. The method of claim 5 further comprising the step of reconstructing said original image in response to said index and said magnitude components of said subset of transform coefficients for each of said blocks.

7. A method for compressing the data required to represent an original image by using a set of save-maps, with each save-map being identified by an index and each save-map identifying a subset of transform coefficients, comprising the steps of:

spatially partitioning said image into a plurality of blocks;

generating, for each block of at least a subset of said plurality of blocks, a set of transform coefficients representative of the data spatially located in that block, with each of said transform coefficients having a magnitude component and a frequency component;

generating an index for each said block as a function of said transform coefficients for that block, comprising the steps of:

organizing the set of transform coefficients for that block into a matrix based on said frequency components of said transform coefficients;

partitioning at least a portion of said matrix into a plurality of zones;

summing the absolute values of the magnitude components of the transform coefficients in each zone to obtain a plurality of zone sums;

summing the absolute values of the magnitude components of all the transform coefficients to obtain a total sum;

dividing each zone sum by said total sum to obtain a normalized zonal activity level for each zone; and comparing said total sum and said normalized zonal activity level with corresponding predefined empirical values to generate a code which constitutes the index for each said block;

selecting one of said save-maps as a function of said index; and employing said index and the magnitude components of the subset of transform coefficients for each said block identified by said selected save-map for that block to represent that portion of said image spatially contained in that block.

8. The method of claim 7 wherein the substep of comparing comprises:

comparing said total sum for each said block with a series of thresholds to generate a block code for the total sum of that block;

comparing the normalized zonal activity level of each zone in that block with a threshold to generate a zone code for each zone sum; and combining said block code and the plurality of zone codes to obtain the index for that block.

* * * * *

UNITED STATES PATENT AND TRADEMARK OFFICE
CERTIFICATE OF CORRECTION

PATENT NO. : 5,038,390
DATED : August 06, 1991
INVENTOR(S) : Vellore C. Ravi Chandran It is certified that error appears in the above-identified patent and that said Letters Patent is hereby corrected as shown below:

Claim 7, column 12, line 5, change "level" to --levels--.

Signed and Sealed this

Twentieth Day of April, 1993

Attest:

MICHAEL K. KIRK

*Attesting Officer*    Acting Commissioner of Patents and Trademarks